US008214871B2

(12) United States Patent
Shalvi et al.

(10) Patent No.: US 8,214,871 B2

(45) Date of Patent: Jul. 3, 2012

(54) SIGNAL COMPRESSION FOR FIBER NODE

(75) Inventors: Ofir Shalvi, Herzlia (IL); Mordechai Segal, Herzlia (IL)

(73) Assignee: Intel Corporation, Santa Clara, CA (US)

( * ) Notice: Subject to any disclaimer, the term of this patent is extended or adjusted under 35 U.S.C. 154(b) by 950 days.

(21) Appl. No.: 11/770,856

(22) Filed: Jun. 29, 2007

(65) Prior Publication Data

US 2007/0288977 A1 Dec. 13, 2007

Related U.S. Application Data

(62) Division of application No. 10/230,815, filed on Aug. 29, 2002.

(60) Provisional application No. 60/317,690, filed on Sep. 6, 2001.

(51) Int. Cl.
*H04N 7/173* (2011.01)

(52) U.S. Cl. ........ 725/121; 725/122; 725/123; 725/124; 725/125; 725/126; 725/127; 725/128; 725/129

(58) Field of Classification Search ........... 725/121–129
See application file for complete search history.

(56) References Cited

U.S. PATENT DOCUMENTS

| | | | | |
|---|---|---|---|---|
| 5,893,024 | A * | 4/1999 | Sanders et al. | 725/125 |
| 5,930,231 | A * | 7/1999 | Miller et al. | 370/210 |
| 5,937,330 | A * | 8/1999 | Vince et al. | 725/125 |
| 6,091,932 | A * | 7/2000 | Langlais | 725/111 |
| 6,327,709 | B1 * | 12/2001 | Ovadia et al. | 725/124 |
| 6,757,910 | B1 * | 6/2004 | Bianu | 725/125 |
| 6,868,552 | B1 * | 3/2005 | Masuda et al. | 725/125 |
| 7,003,449 | B1 * | 2/2006 | Absar et al. | 704/200.1 |
| 7,623,532 | B2 * | 11/2009 | Liva et al. | 370/401 |

* cited by examiner

*Primary Examiner* — Pankaj Kumar
*Assistant Examiner* — Charles N Hicks
(74) *Attorney, Agent, or Firm* — Grossman, Tucker, Perreault & Pfleger, PLLC

(57) ABSTRACT

A method, device and network for compressing cable modem data signals and conserving bandwidth within the network. Cable modems transmit upstream data signals to a fiber node which compresses the data signals and transmits the compressed signals upstream to a headend which decompresses the data signals. The fiber node compression may be by a shaping filter or a fast Fourier transform (FFT) function. The headend decompression may be by an inverse shaping filter or an inverse FFT function.

13 Claims, 3 Drawing Sheets

100 130 FIBER NODE 134 148 DSP ANALYSIS AND CONTROL 131 132 110 AFE DFE CM FAST A/D DOWN CONVERTER LPF AND DECIMATE SHAPING FILTER SHAPING FILTER AGC QUANTIZER ON/OFF SWITCH 136 138 140 142 144 146 150 152

HEADEND DSP ZERO PADDING INVERSE AGC INVERSE SHAPING FILTER INTERPOLATION AND UP-CONVERT D/A 168 ANALOG OUTPUT NODE 158 160 162 164 156 DIGITAL OUTPUT NODE 154 112 166

100
130
FIBER NODE
134
148
DSP
ANALYSIS AND CONTROL
131
132
110
AFE
DFE
CM
FAST A/D
DOWN CONVERTER
LPF AND DECIMATE
SHAPING FILTER
SHAPING FILTER
AGC
QUANTIZER
ON/OFF SWITCH
136
138
140
142
144
146
150
152
HEADEND
DSP
168
ZERO PADDING
INVERSE AGC
INVERSE SHAPING FILTER
INTERPOLATION AND UP-CONVERT
D/A
ANALOG OUTPUT NODE
158
160
162
164
156
DIGITAL OUTPUT NODE
154
112
166

200
210
CM
FIBER NODE
231
AFE
FAST A/D
236
232
DFE
DOWN CONVERTER
238
LPF AND DECIMATE
240
234
DSP
FFT
270
248
ANALYSIS AND CONTROL
AGC
246
QUANTIZER
250
ON/OFF SWITCH
252
HEADEND
DSP
254
ZERO PADDING
258
INVERSE AGC AND QUANTIZER
260
IFFT
272
INTERPOLATION AND UP-CONVERT
264
D/A
256
212
268
ANALOG OUTPUT NODE
DIGITAL OUTPUT NODE
266

SIGNAL COMPRESSION FOR FIBER NODE

CROSS REFERENCE TO RELATED APPLICATIONS

This application is a Divisional of and claims priority under 35 U.S.C. §120 to

United States patent application 10/230,815, filed on Aug. 29, 2002 which is a non-provisional application of Application Ser. No. 60/317,690 filed 09/06/2001 (now abandoned).

TECHNICAL FIELD

This invention relates generally to communications networks, and more particularly to data transmission using a cable modem.

BACKGROUND

With reference to FIG. 1, cable TV (CATV) networks have utilized legacy set-top boxes (STB's) 11 for many years. Such set-top boxes are coupled via a coaxial cable to a headend 12 for cable TV service. Legacy cable telephony 13 sets can also be coupled to the cable network for information exchange.

Cable modems 10 are being deployed today that allow high-speed Internet access in the home over a cable network, often referred to as a Hybrid Fiber/Coax (HFC) cable network. The architecture of a cable modem used in a cable network is shown in FIG. 1. Cable modems (CM) 10 are units that are installed as consumer premises equipment (CPE) that may comprise a personal computer (PC) or other computing device, for example. A cable modem 10 is adapted to communicate with the cable modem termination system (CMTS) that is typically located at a cable network service provider's headend 12. The cable modem 10 is a modulator/demodulator that receives Internet traffic or information, data, TV signals, and telephony from a server through the CMTS and puts it into a format recognizable by a user's PC, allowing a user to browse the Internet, and send/receive e-mail just as they would with a conventional modem on a PC. A cable modem 10 may include a Media Access Control (MAC) layer, a data link layer, and may include network layers. Using a cable modem 10 over a cable network provides a much faster connection, being at least 50 times faster than a 56K modem, for example.

A cable modem 10 performs modulation and demodulation, and the operations necessary to interface with a PC. A cable modem 10 typically comprises a transmitter 14 for upstream modulation of a data signal, usually in short bursts, to a receiver 16 in the headend 12 that serves as an upstream demodulator. The upstream direction refers to sending a data signal from the user at the cable modem 10 towards the headend 12. The upstream signal may comprise TV channel requests, program selection or Internet data request information and telephony signals, for example, and may be a QPSK/16-QAM modulation format at 3 Mbits/s. Cable modem 10 also comprises a receiver 18 for downstream demodulation of signals received from a transmitter 20 in the headend 12 that serves as a downstream modulator. The downstream direction refers to sending a data signal from the headend 12 to the cable modem 10. The downstream modulation/demodulation may be 64-QAM/256 QAM modulation format at 27-56 Mbits/s, depending on the bandwidth, for example. Both the cable modem 10 and headend 12 include MAC functionality, not shown, that control the MAC sublayer of the communication network.

A recent development in cable TV network is the addition of a fiber node 30 coupled between the central office headend 12 and the cable modems 10 in users' homes, as shown in FIG. 1. The fiber node 30 may comprise a fiber node such as AT&T's mini fiber node (mFN) and may be adapted to service around fifty homes or users. A fiber node 30 increases network capacity and reliability, and reduces operating costs, by reducing active components on the final coaxial run to the home.

A problem with using a fiber node 30 in a cable network is that a lot of bandwidth is required. Bandwidth for set-top boxes 11 must be assigned, even though there may be silence on many of the frequencies for the STBs 11.

SUMMARY OF THE INVENTION

Embodiments of the present invention facilitate the operation of a cable modem with a fiber node by sending narrow bandwidth data signals in the upstream direction to utilize bandwidth better than in prior art fiber node systems. Silence in the band, for set-top boxes for example, is detected, and the frequency bands are dynamically selected to take advantage of unused bandwidth within the frequency spectrum. Preferably a digital signal processor (DSP) is used to process the data signals. A signal compression approach using a shaping filter or a fast Fourier transform function may be implemented, for example, in accordance with embodiments of the present invention, to provide the use of a narrower bandwidth using a fiber node than in the prior art.

Disclosed is a method of data transmission in a cable network including a headend providing data transmission to a cable modem and set-top box via a fiber node, the fiber node providing cable service to a plurality of cable modem users. The method comprises receiving an upstream data signal from a cable modem, compressing the upstream signal to a narrow bandwidth for upstream data signal bands required, and sending the compressed upstream data signal to the headend.

Also disclosed is a fiber node for use in a cable network including a headend providing data transmission to a cable modem via the fiber node, where the fiber node provides cable service to a plurality of cable modem and set-top box users. The fiber node includes an analog-to-digital converter (ADC) coupled to the cable modem, where the ADC is adapted to convert an analog data signal received from the cable modem to a digital data signal. A down converter is coupled to the ADC for moving the central frequency of the digital data signal down. A decimater is coupled to the down converter for decimating the digital data signal. An automatic gain control (AGC) amplifier is coupled to the decimater, with the AGC amplifier being adapted to amplify the decimated digital data signal. A quantizer is coupled to the AGC amplifier and is adapted to quantize the digital data signal. A switch input is coupled to the quantizer, the switch being adapted to produce a digital signal at the output. An analysis and control circuit is coupled to and adapted to control the AGC, quantizer and switch, wherein an upstream data signal received from a cable modem is compressed.

Further disclosed is a headend for a cable network adapted to decompress the compressed data signal received from a fiber node that has compressed an upstream data signal.

Also disclosed is a cable network, comprising a plurality of cable modems, a fiber node coupled to the cable modems facilitating cable network service to the plurality of cable modems, and a headend coupled to the fiber node providing cable modem service to the cable modems through the fiber node, wherein the fiber node is adapted to receive an upstream data signal from a cable modem, compress the upstream signal to a narrow bandwidth for required upstream data signal bands, and send the compressed upstream data signals to the headend.

Advantages of embodiments of the invention include compressing bandwidth to more efficiently use the frequency spectrum of a cable network. Compressing the signals for set-top boxes, for example, frees up capacity, allowing more users to have access to the CATV network. The data rate of data signals is increased, resulting in faster access to the Internet and other CATV network services. Silence periods are taken advantage of in accordance with embodiments of the present invention. Another advantage is providing a universal solution that may be placed in a fiber node, requiring a small amount of space such as a single card.

BRIEF DESCRIPTION OF THE DRAWINGS

The above features of embodiments of the present invention will be more clearly understood from consideration of the following descriptions in connection with accompanying drawings in which.

Corresponding numerals and symbols in the different figures refer to corresponding parts unless otherwise indicated. The figures are drawn to clearly illustrate the relevant aspects of the preferred embodiments and are not necessarily drawn to scale.

DETAILED DESCRIPTION OF PREFERRED EMBODIMENTS

Figure 2:
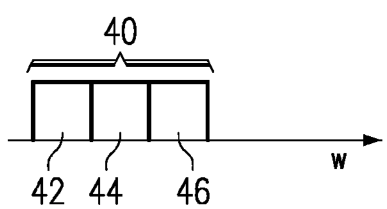
FIG. 2 shows a channel in the cable TV frequency spectrum used for a cable modem.

FIG. 2 shows a possible upstream channel in the cable TV frequency spectrum used for a cable modem. In the United States, the frequency bandwidth used for upstream Cable TV transmission is between 5 MHz and 42 Mhz. See, for example, DOCSIS (Data-Over-Cable Service Interface Specifications) Radio Frequency Interface Specification SP-RFI-105-991105 (1999. Cable Television Laboratories, Inc.), incorporated herein by reference. Transmission of cable TV and data signals is sent in sets of approximately 6 MHz bandwidth CATV channels or slots, as shown at transmission channel 40. Through a cable modem there are several types of upstream data signals that may be transmitted. Telephony 42, DOCSIS cable 44 and pay-per-view (PPV) cable 46 information may be transmitted in the upstream direction, for example.

Figure 1:
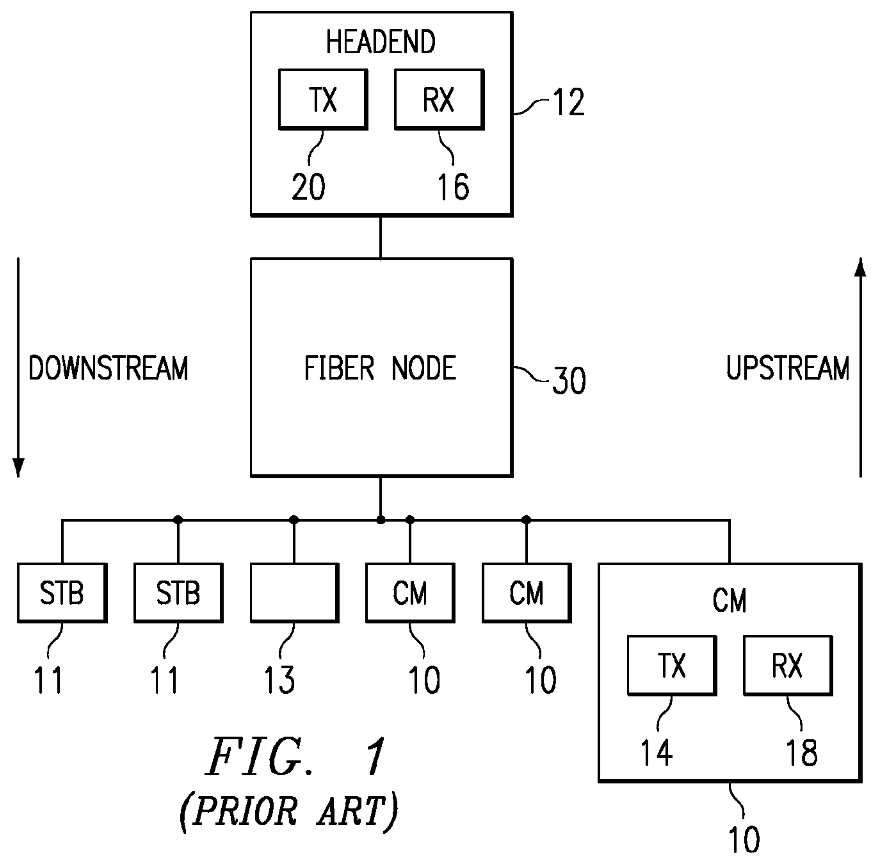
FIG. 1 illustrates a prior art cable network having a fiber node facilitating communication between a central office headend and a plurality of cable modems and set-top boxes.

A problem in the prior art fiber node configuration shown in FIG. 1 is that portions of the channel 40 bandwidth are reserved for each data signal 42, 44, 46 transmitted such as for a set-top box 11, whether or not data is being transmitted. This uses up a large amount of bandwidth unnecessarily. What is needed in the art is a method of conserving bandwidth on cable modem upstream channels, increasing the amount of bandwidth available in the network.

Figure 5:
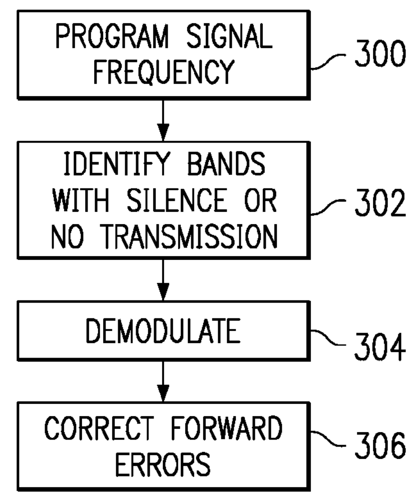
FIG. 5 illustrates a flow chart of the compression of the upstream data signal by the fiber node in accordance with embodiments of the present invention.
Figure 3:
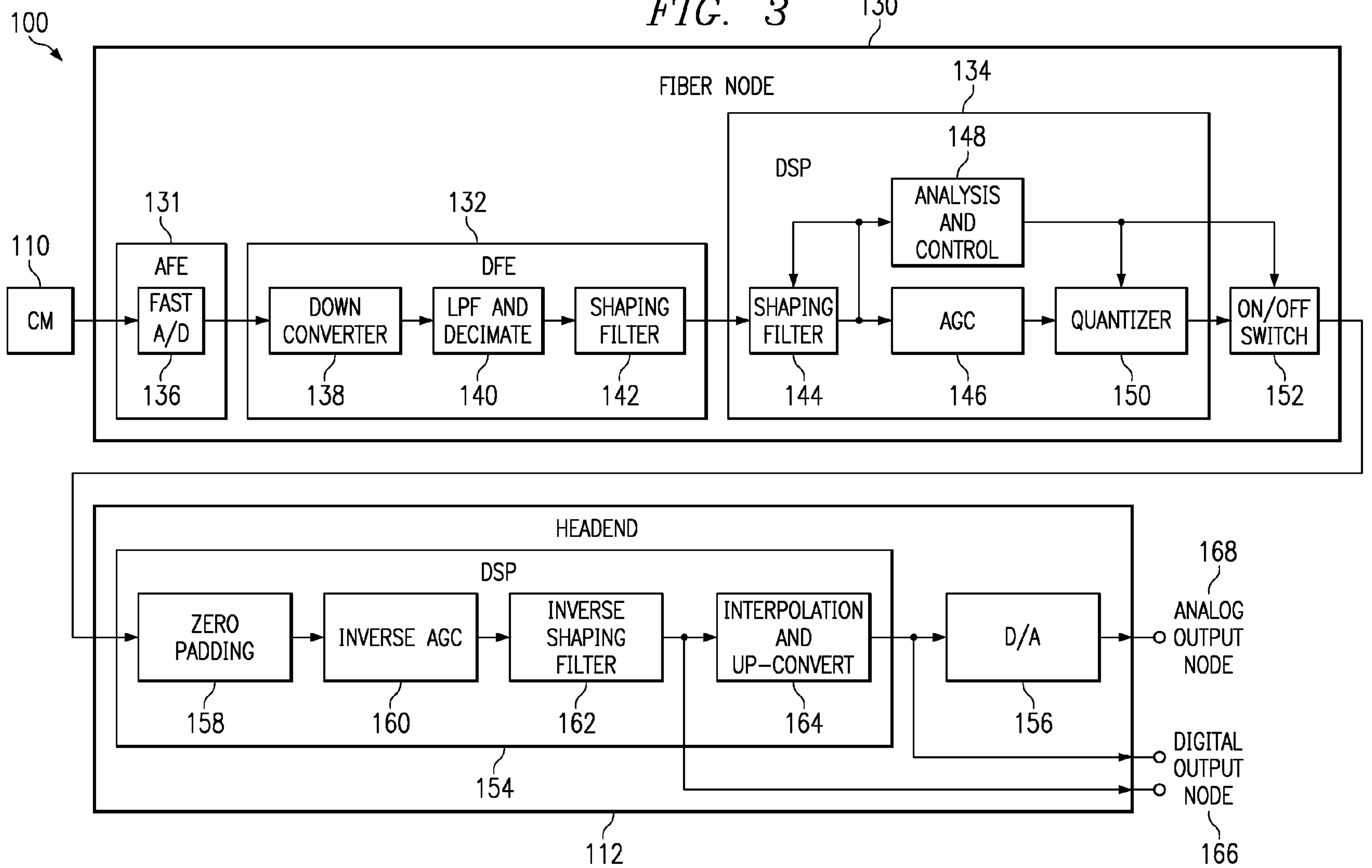
FIG. 3 shows a first embodiment of the present invention having a shaping filter in the fiber node and an inverse shaping filter in the headend.
Figure 4:
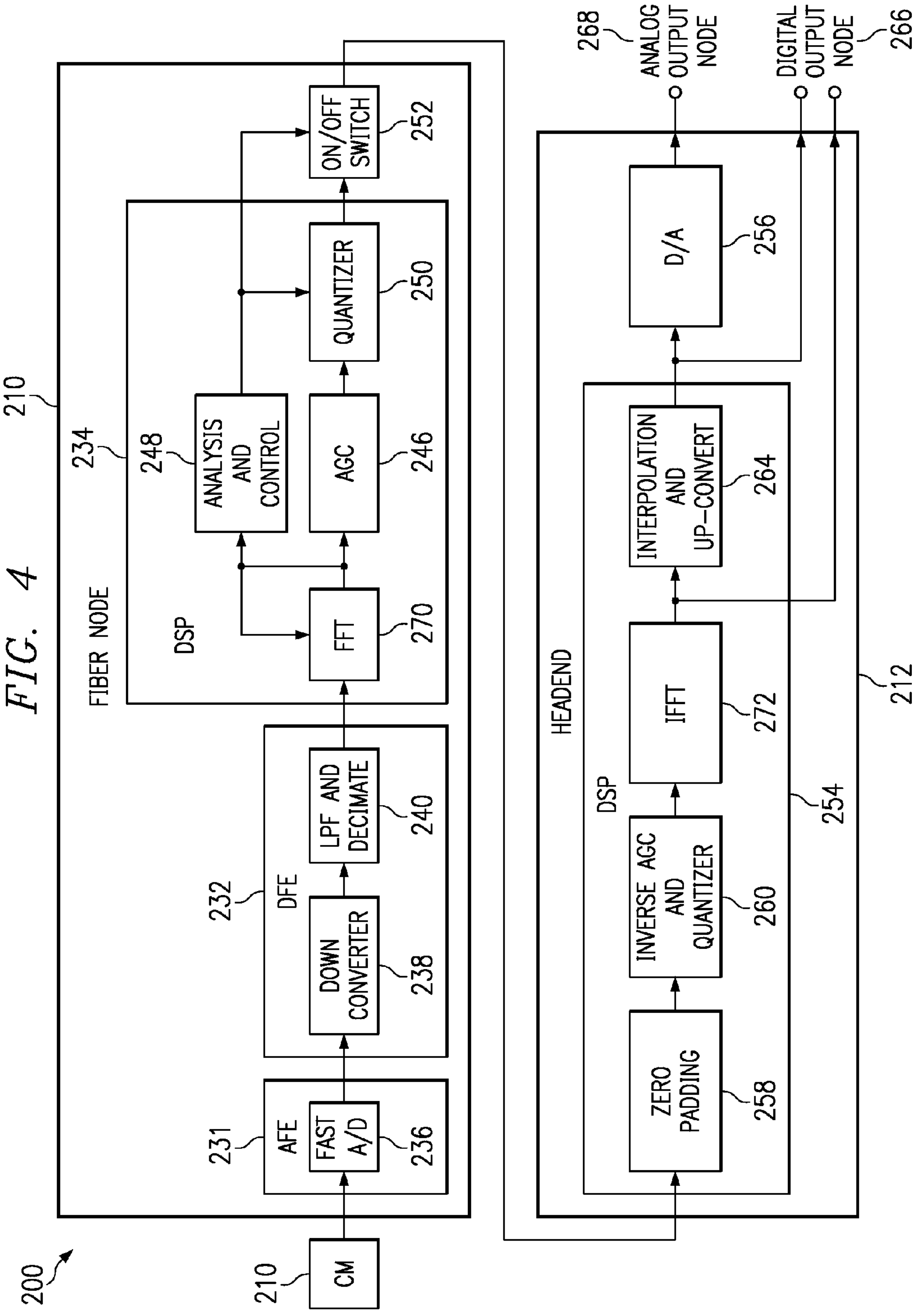
FIG. 4 shows a second embodiment of the present invention having a fast Fourier transfer function in the fiber node and an inverse fast Fourier transfer function in the headend.

Embodiments of the present invention solve this prior art problem by reconfiguring the bandwidth to take advantage of silence within upstream channels, and dynamically distributing the available slots. FIGS. 3-5 illustrate exemplary embodiments of the present invention.

A carrier for each data signal 42, 44, 46 information type is anticipated and the possible parameters of each information or data signal type is next described, for use with embodiments of the present invention described herein. Legacy telephony 42 signals may be single carrier, or a group of adjacent frequency division multiplexing (FDM) carriers. Telephony signals 42 typically are slow frequency hopping signals, e.g. a few hops per day. DOCSIS is the dominant cable model standard that defines technical specifications for both cable modems and the CMTS. DOCSIS signals 44 may be modulated with a specific modulation scheme, for example, 4-1024 QAM modulation format, with a symbol rate of 0.16-5.12 Mbaud, and a roll-off factor of 10%-25%. DOCSIS signals 44 typically operate in a burst mode and may have long silence periods because they reflect a PC users' requests, for example, and may be infrequent, e.g., a few times a day. The power level and spectral shape of DOCSIS signals 44 may be controlled to achieve a fixed level and a nearly white spectrum at the fiber node 130 (shown in FIG. 3). PPV 46 requests may comprise narrow band frequency shift keying (FSK) signals at known frequency bands. PPV 46 signals are typically signal bursts that appear from time to time with varying power levels. Although not particularly relevant in embodiments of the present invention, other signals anticipated are National Television Standards Committee (NTSC) signals in the upstream plant, and test signals, for example.

Embodiments of the present invention use data compression and IP format packaging to achieve a more efficient use of bandwidth in a CATV network. Two compression approaches in accordance with embodiments of the present invention will next be described. FIG. 3 shows generally at 100 a first embodiment having a DSP 134, 154 in a fiber node 130 and headend 112, respectively for compressing the upstream data signal bandwidth. Cable modem 110 comprises a unit located at a user's PC or other computing device and is adapted to perform modulation and demodulation, and other operations necessary to interface with the computing device. Cable modem 110 is coupled through coaxial cables or HFC in a home or other building to a fiber node 130, which may be located on a telephone pole or other remote location. Fiber node 130 is adapted to provide CATV modem service to cable modem 110. Fiber node 130 is coupled to headend 112 which is typically located in a CMTS. Headend 112 provides CATV modem service to fiber node 130, other fiber nodes in the CATV network, not shown, and directly to cable modems 110.

Fiber node 130 comprises an analog front end (AFE) 131 coupled to cable modem 110. AFE 131 may comprise an amplifier and an anti-aliasing band pass filter (BPF) (not shown) coupled to a fast A/D converter 136. AFE 131 receives an upstream analog signal from cable modem 110, amplifies it, filters it, and converts it to a digital signal at the AFE 131 output.

The output of AFE 131 is coupled to the input of digital front end (DFE) 132. AFE 131 and DFE 132 may comprise a single integrated circuit (IC), and for example, may comprise a 4522 chip. Alternatively, AFE 131 and DFE 132 may comprise separate components. DFE 132 comprises a down converter 138 for down converting the digital signal received from the AFE 131. The down converter 138 preferably comprises a numerically controlled oscillator and multipliers and functions to shift a central frequency of the digital signal down in frequency.

Down converter 138 is coupled to a low pass filter (LPF) and decimater 140 adapted to filter and decimate the digital signal received from the down converter 138. The LPF and decimater preferably comprise a delay line, multiplier and adders, respectively, and may alternatively comprise a DSP software implementing a filter, for example. An optional shaping filter 142 may be coupled to LPF and decimater 140. The DFE 132 may be modified to add a programmable filter at the last stage that has a small roll-off factor. The signal output from the DFE 132 comprises samples at twice the bandwidth of the signal, where the edges of the signal may be attenuated due to the roll-off of the last stage filter, for example.

DFE 132 is coupled to a DSP 134 as shown. DSP 134 may comprise an optional shaping filter 144, although preferably a shaping filter is located in the DFE 132 or the DSP 134, but not both. The shaping filter 142 or 144 implemented in either the DFE 132 or DSP 134, respectively, has coefficients of 1-P(z), where P(z) is the predictor filter. Shaping filter 142 or 144 is typically useful only for non-white signals. Shaping filter 144 is coupled to automatic gain control (AGC) 146 that is adapted to track the magnitude of the signal and amplify it in order to utilize the full range of the A/D converter 136. AGC 146 preferably comprises a software implementing a power detector and a multiplier and alternatively may comprise an external AGC hardware, for example. Shaping filter 144 is also coupled to an analysis and control circuit 148, the analysis and control circuit 148 being adapted to identify the peak magnitude of the signal, trim the AGC 146, identify a signal existence, control on/off switch 152, and track the signal spectrum and control shaping filter 144, for example. AGC 146 is coupled to quantizer 150, which may comprise a uniform quantizer with a variable number of bits per sample, from 4 to 10, for example. Alternatively, quantizer 150 may comprise a non-linear quantizer. On/off switch 152 is coupled to the output of DSP 134. Switch 152 may be turned off when the DSP 134 analysis and control circuit 148 identifies a silence period, for example, between signal bursts, to conserve bandwidth.

DSP 134 may receive samples from the DFE 132 that correspond to a certain frequency band, and analyze the spectrum to identify new carriers, which may be particularly useful for frequency hopping systems, for example. The output of the fiber node 130 comprises packets preferably having the following structure: start and end sample number of the frame; gain level of the frame, predictor coefficients of the frame, and sample values, as examples.

Headend 112 comprises a DSP 154 adapted to receive a signal from fiber node 130 DSP 134 through on/off switch 152. DSP 154 comprises a zero padding unit 158 that adds silence periods in the time period where the on/off switch 152 of the fiber node 130 is turned off. Zero padding unit 158 is coupled to an inverse AGC 160 in headend 112 that divides the signal sequence by the gain value which is sent by the fiber node 130. Inverse AGC 160 preferably comprises a software implementing a multiplier, for example. Inverse AGC 160 is coupled to an inverse shaping filter 162 (1/(1-P(z)) that inverts the operation of the shaping (prediction) filter 142 or 144 of the fiber node 130. Inverse shaping filter 142, 144 preferably comprises a software implementing a filter and may alternatively comprise a delay line, multipliers and adders, for example. Inverse shaping filter 162 is optional, and not required if a shaping filter 142 or 144 is not used in the fiber node 130. Inverse shaping filter 162 is coupled to an interpolation and up-convert module 164 and also to a digital output node 166. The signal may be sent through the digital output node 166 digitally to a headend receiver or converter, or alternatively the signal may be sent to an analog intermediate frequency (IF) signal by interpolator and up converter module 164 and fed into a headend receiver, not shown, through analog output node 168. Interpolator and up converter preferably comprise a zero insertion device and half band filters, and numerically controlled oscillator (NCO) and multipliers, respectively, and may alternatively comprise a cubic interpolator and NCO and multipliers, for example. The interpolator interpolates the digital signal to create an analog signal having a central frequency, and the up converter up converts or moves the analog signal up to a slot within the bandwidth of the CATV network.

FIG. 4 shows a second embodiment of the present invention generally at 200 that employs a frequency-based approach and fast Fourier transforms to compress the upstream data signal bandwidth. Fiber node 210 comprises an AFE 231 coupled to cable modem 210. AFE 231 may comprise an amplifier, and an anti-aliasing band pass filter (BPF) (not shown) coupled to a fast A/D converter 236. AFE 231 receives an upstream analog signal from cable modem 210, amplifies it, filters it, and converts it to a digital signal.

The output of AFE 231 is coupled to the input of DFE 232. AFE 231 and DFE 232 may comprise a single IC, for example, and may comprise a 4522 chip. DFE 232 comprises a down converter 238 for down converting the digital signal received from the AFE 231. Down converter 238 is coupled to a LPF and decimater 240 adapted to filter and decimate the digital signal received from the down converter 238. An optional shaping filter 242 may be coupled to LPF and decimater 240. The DFE 232 may be modified to add a programmable filter at the last stage that has a small roll-off factor. The signal output from the DFE 232 comprises samples at twice the bandwidth of the signal, where the edges of the signal may be attenuated due to the roll-off of the last stage filter, for example.

DFE 232 is coupled to a DSP 234, as shown. A Fast Fourier Transform (FFT) function 270 is coupled to an AGC 246, which AGC 246 preferably comprises a software implementing a power detector and a multiplier and may alternatively comprise an external AGC hardware, for example. The FFT function 270 may reside in a microprocessor, for example, and may also comprise an external FFT engine. FFT function 270 is also coupled to an analysis and control circuit 248, the analysis and control circuit 248 being adapted to identify the peak magnitude of the signal, trim the AGC 246, identify a signal existence, control on/off switch 152, and track the signal spectrum and control shaping filter 144, for example. The analysis and control circuit 248 may comprise a microprocessor, for example, and alternatively may comprise a field programmable gate array (FPGA), for example. The analysis & control circuit 248 functions and FFT function 270 may reside within a single microprocessor, for example, and alternatively may reside within separate components. AGC 246 is coupled to quantizer 250, which may comprise a uniform quantizer with a variable number of bits per sample, from 4 to 10, for example. Alternatively, quantizer 250 may comprise a non-linear quantizer. On/off switch 252 is coupled to the output of DSP 234. Switch 252 may be turned off when the DSP 234 analysis and control circuit 248 identifies a silence period, for example, between signal bursts, to conserve bandwidth.

Headend 212 comprises a DSP 254 adapted to receive a signal from fiber node 230 DSP 234 through on/off switch 252. DSP 254 comprises a zero padding unit 258 that adds silence periods in the time period where the on/off switch 252 of the fiber node 230 is turned off Zero padding unit 258 is coupled to an inverse AGC 260 in headend 212 that divides the signal sequence by the gain value which is sent by the fiber node 230. Inverse AGC 260 is coupled to an inverse fast Fourier transform (IFFT) function 262 that inverts the operation of the FFT function 270 of the fiber node 230. IFFT function 272 may comprise, for example, a microprocessor, or may alternatively comprise an external FFT engine. IFFT function 272 is coupled to an interpolation and up-convert module 264 and also to a digital output node 266. The signal may be sent through the digital output node 266 digitally to a headend receiver or converter, or alternatively the signal may be sent to an analog IF signal by interpolator and up-converter 264 and fed into a headend receiver, not shown, through analog output node 268.

In the second embodiment shown in FIG. 4, an analog data signal is processed by the AFE 231 and DFE 232 where the data signal is divided into blocks, the DSP 234 FFT function 270 performs a fast Fourier transform on each block. The quantizer 250 quantizes each data signal FFT bin. The DSP 234 analysis & control unit 248 dynamically allocates a different number of bits per each frequency bin of the data signal.

As described with reference to FIGS. 3 and 4 above, an upstream signal is received by the fiber node 110, 210 from a cable modem 110, 210. The fiber node 110, 210 compresses the upstream signal to a narrow bandwidth by detecting the frequencies that are required to be used at any given moment. Rather than using all the bands in the bandwidth, as in the prior art, only the information that is currently required is sent, reducing the number of required upstream frequencies. The fiber node 110, 210 sends the compressed upstream signal to the headend 112, 212, and the headend 112, 212 decompresses the upstream signal. FIG. 5 shows a flow chart of the upstream signal compression performed by the fiber node 110, 210 in accordance with embodiments of the present invention. The signal frequency is programmed (step 300), and the bands with silence or no transmission are identified (step 302). The signal is demodulated (step 304), and forward errors are corrected (step 306).

Preferably, in the architecture of embodiments of the present invention, each IC DFE (132, 232) is a dual mode unit that can operate either on a DOCSIS signal or on a legacy/future signal. As a performance example, the first embodiment shown in FIG. 3 without a shaping filter 142, 144 in the fiber node 130 and inverse shaping filter 162 in the headend 112, a pre-equalized DOCSIS signal yields 18-20 bits per 64 QAM modulation format symbol, for a loss of less than 0.5 dB. Therefore, the data rate on the fiber is increased by a factor of 3 compared to other fiber nodes that detect the data itself, albeit taking off the DOCSIS overhead (of about 20%) and silence periods.

Embodiments of the novel circuit and method disclosed herein achieve technical advantages by providing a fiber node 110, 210 and headend 112, 212 architecture adapted to compress bandwidth and more efficiently use the frequency spectrum of a CATV network. Compressing the signals frees up capacity, allowing more users to have access to the CATV network. The data rate of data signals is increased, resulting in faster access to the Internet and other CATV network services. Silence periods are taken advantage of in accordance with embodiments of the present invention. Another advantage is providing a universal solution that may be placed in a fiber node, requiring a small amount of space such as a single card.

While embodiments of the invention have been described with reference to illustrative embodiments herein, this description is not intended to be construed in a limiting sense. Various modifications in combinations of the illustrative embodiments, as well as other embodiments of the invention, will be apparent to persons skilled in the art upon reference to the description. While the signal compression has been described herein as being implemented in hardware, the signal compression may alternatively be implemented in software, for example. It is therefore intended that the appended claims encompass any such modifications or embodiments.

what is claimed is:

1. A fiber node comprising:

an analog-to-digital converter (ADC) coupled to a plurality of cable modems, the ADC adapted to convert an analog data signal received from at least one of the plurality of cable modems to a digital data signal, the digital data signal having a central frequency;

a down converter coupled to the ADC for moving the central frequency of the digital data signal down;

a decimater coupled to the down converter for decimating the digital data signal;

an automatic gain control (AGC) amplifier coupled to the decimater adapted to amplify the decimated digital data signal;

a quantizer coupled to the AGC amplifier adapted to quantize the digital data signal;

an on/off switch having an input and an output, the input being coupled to the quantizer, the switch being adapted to produce a digital signal at the output; and an analysis and control circuit coupled to and adapted to control the AGC, quantizer and switch, wherein the analysis and control circuit:

turns off the on/off switch when no data signal is present; and identifies at least one silence period to conserve bandwidth in at least one output data channel from said fiber node, said at least one silence period corresponding to an absence of data signals from at least one of said plurality of cable modems; and dynamically allocates slots within said bandwidth based on said at least one silence period; and wherein an upstream data signal received from at least one of said plurality of cable modems is compressed.

2. The fiber node according to claim 1 further comprising a low pass filter (LPF) coupled between the decimater and the down converter for filtering the digital data signal.

3. The fiber node according to claim 2 further comprising a shaping filter coupled between the decimater and the AGC, the shaping filter adapted to filter the decimated digital data signal.

4. The fiber node according to claim 2 further comprising a fast Fourier transform (FFT) function coupled between the decimater and the AGC, the FFT adapted to perform a FFT on the decimated digital data signal.

5. The fiber node according to claim 4 wherein the FFT function comprises a microprocessor.

6. The fiber node according to claim 1 wherein the analysis and control circuit, AGC amplifier, and quantizer comprise a digital signal processor (DSP).

7. In a cable network including a headend providing data transmission to a cable modem and a set-top box via a fiber node, the fiber node providing service to a plurality of cable modem users, the fiber node comprising:

an analog-to-digital converter (ADC) adapted to convert an analog data signal received from at least one of a plurality of cable modems to a digital data signal, the digital data signal having a central frequency;

a down converter coupled to the ADC for moving the central frequency of the digital data signal down;

a decimater coupled to the down converter for decimating the digital data signal;

an automatic gain control (AGC) amplifier coupled to the decimater adapted to amplify the decimated digital data signal;

a quantizer coupled to the AGC amplifier adapted to quantize the digital data signal;

an on/off switch having an input and an output, the input being coupled to the quantizer, the switch being adapted to produce a digital signal at the output;

an analysis and control circuit adapted to control the AGC, quantizer and switch, wherein the analysis and control circuit:

turns off the on/off switch when no data signal is present;

identifies at least one silence period to conserve bandwidth in at least one output data channel from said fiber node, said at least one silence period corresponding to an absence of data signals from at least one of said plurality of cable modems; and dynamically allocates slots within said bandwidth based on said at least one silence period; and wherein an upstream data signal received from at least one of said plurality of cable modems is compressed by said fiber node to form a compressed data signal;

a headend for a cable network that is adapted to receive said compressed data signal from said fiber node and decompress said compressed data signal.

8. The headend according to claim 7, comprising: a zero padding function coupled to the fiber node switch, the zero padding function adapted to add silence to the digital data signal in time periods where the fiber node switch is turned off; an inverse AGC amplifier coupled to the zero padding function adapted to divide the signal by the amplification added by the fiber node AGC; an interpolation module for interpolating the digital data signal; and a up converter adapted to move the central frequency of the digital data signal.

9. The headend according to claim 8, wherein the zero padding function, inverse AGC, interpolation module and up converter comprise a digital signal processor (DSP).

10. The headend according to claim 8, further comprising a digital-to-analog converter coupled to the up converter adapted to convert the decompressed digital data signal to an analog data signal.

11. The headend according to claim 8, further comprising: an inverse shaping filter coupled between the inverse AGC amplifier, wherein the fiber node further comprises a shaping filter coupled between the decimater and the AGC amplifier, the fiber node shaping filter adapted to filter the decimated digital data signal, wherein the headend inverse shaping filter reverses the effect of the fiber node shaping filter.

12. The headend according to claim 8, further comprising: an inverse fast Fourier transform (FFT) function coupled between the zero padding function and the inverse AGC amplifier, wherein the fiber node further comprises a fast Fourier transform (FFT) function coupled between the decimater and the AGC, the FFT function adapted to perform a FFT function on the decimated digital data signal, wherein the headend inverse FFT function reverses the effect of the fiber node FFT function.

13. The headend according to claim 12 further comprising a quantizer coupled between the inverse FFT function and the inverse AGC amplifier, the quantizer adapted to quantize the data signal.

* * * * *